INVENTOR.
Louis G. Lombi

Dec. 18, 1956 L. G. LOMBI 2,774,313
RAVIOLI MACHINE
Filed Nov. 14, 1955 3 Sheets-Sheet 2
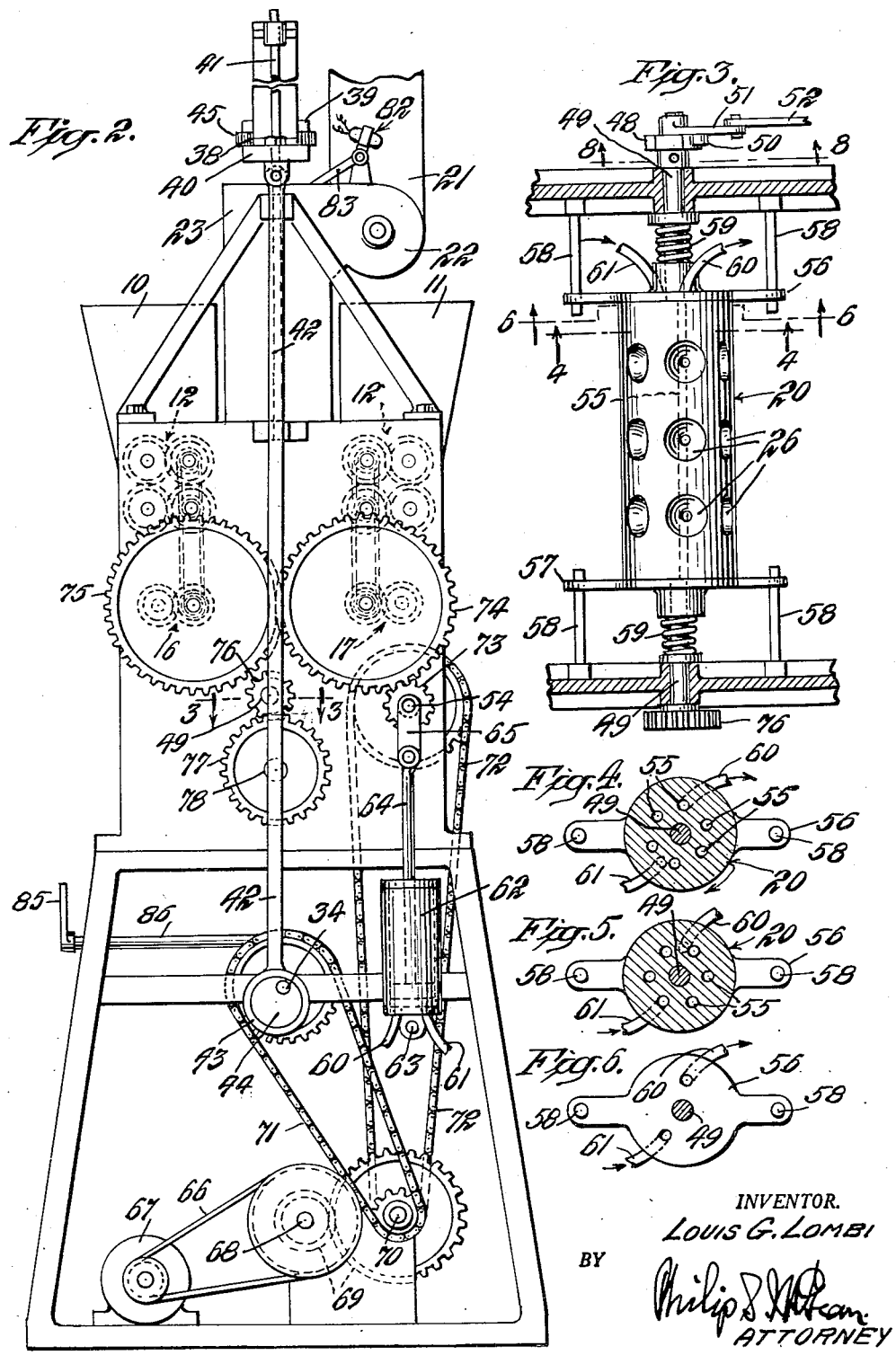
INVENTOR.
LOUIS G. LOMBI
BY
ATTORNEY Dec. 18, 1956     L. G. LOMBI     2,774,313
RAVIOLI MACHINE
Filed Nov. 14, 1955     3 Sheets-Sheet 3
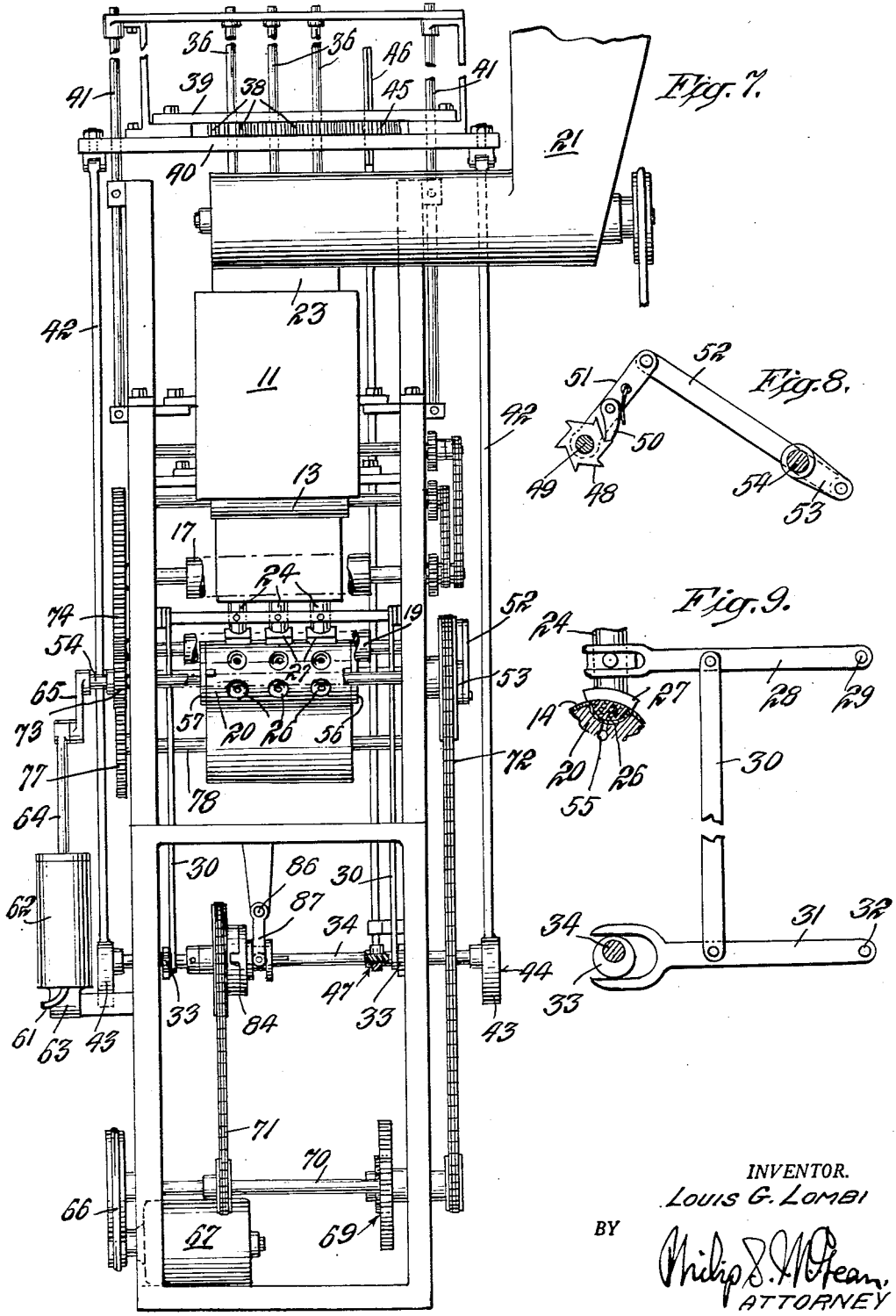
INVENTOR.
Louis G. Lombi
BY
*Philip S. McPean*
ATTORNEY

United States Patent Office 2,774,313
Patented Dec. 18, 1956

2,774,313

RAVIOLI MACHINE

Louis G. Lombi, West Englewood, N. J., assignor to Ezio L. Lombi, West Englewood, N. J.

Application November 14, 1955, Serial No. 546,538

3 Claims. (Cl. 107—1)

The invention herein disclosed relates to machines for producing ravioli and similar products.

Special objects of the invention are to provide a machine for the purpose which will be automatic in its operation and which will produce an improved product of uniform character.

Particularly it is a purpose of the invention to accomplish uniform and complete filling of the ravioli cakes or units and to accomplish this with simple, reliable mechanism.

The foregoing and other desirable objects are attained by novel features of construction, combinations and relations of parts, all as hereinafter specified and as illustrated by way of example in the accompanying drawings.

In these drawings, illustrating a present practical embodiment of the invention, Fig. 1 is a broken vertical sectional view of one of the machines and showing successive stages in the operation of laying a sheet of dough over mold cavities in a die roll, sucking the sheet down into the cavity and filling it with the material and then laying a second cover sheet over the filling and expelling the completed unit from the cavity in the die roll;

Fig. 2 is an end elevation of the machine, parts appearing broken away;

Fig. 3 is an enlarged broken section and plan view of the die roll taken on substantially the plane of line 3—3 of Fig. 2;

Fig. 4 is a cross-sectional view as on substantially the plane of line 4—4 of Fig. 3, showing a mold passage in the roll lined up with the suction applying connection for drawing the first dough layer into the mold cavity;

Fig. 5 is a similar view showing a passage at the other side of the roll lined up with the pressure connection for expelling a completed unit from a mold cavity;

Fig. 6 is a sectional view as on line 6—6 of Fig. 3 and showing the valve plate provided with suction and pressure connections;

Fig. 7 is a broken side elevation of the machine;

Fig. 8 is a detail view of the ratchet mechanism for intermittently turning the die roll, with parts appearing as on substantially the plane of line 8—8 of Fig. 3;

Fig. 9 is a broken part sectional view of one of the filling nozzles and cam mechanism for raising and lowering the same in respect to the sheet of dough on the die roll.

Figure 1:
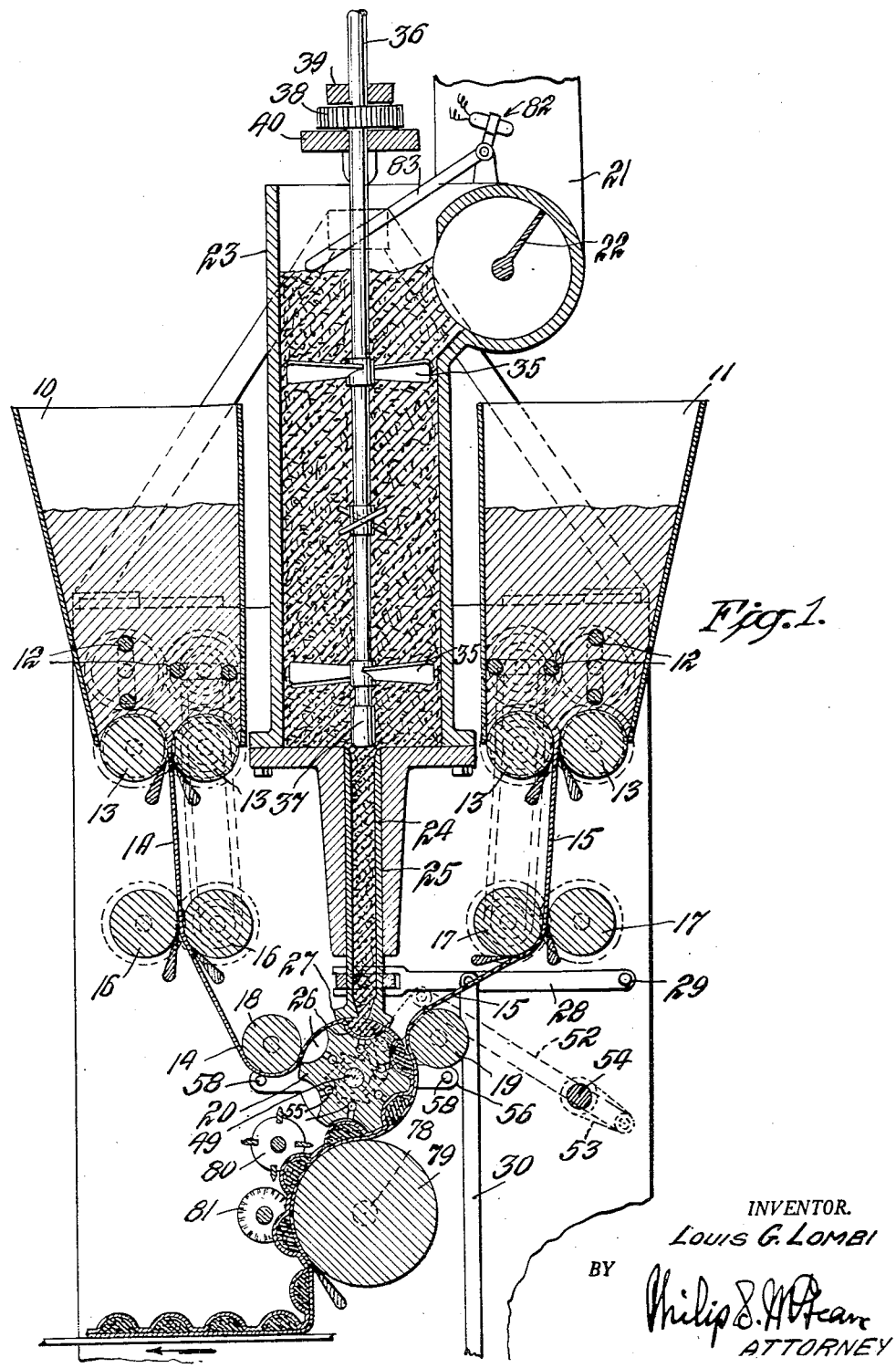

In Fig. 1 the machine is shown as comprising hoppers 10 and 11 containing beater and mixing mechanism 12 and companion rolls 13 for forming dough in two sheets 14, 15 which are passed downward between feed rolls 16, 17 and around guide and pressure rolls 18, 19 to the die roll 20.

The filling material is advanced from a hopper 21 by feed screw 22 to upright magazines 23 which have tubular nozzles 24 guided at 25 in the bottom of the same in line with mold cavities 26 in the surface of the die roll.

The end of each delivery tube 24 is shown as terminated in an arcuate nozzle 27 curved to closely fit over the first foundation sheet of dough 14 on the roll.

Each nozzle tube is reciprocated toward and away from the die roll by a fork lever 28 pivoted at 29 and actuated by link 30, Fig. 9, from a lower lever 31 pivoted at 32 and oscillated by cam 33 on shaft 34.

The filling in magazines 23 is propelled downwardly by blades 35 on shafts 36 and the latter are shown as formed as plungers 37 at their lower ends to positively feed the material down through the nozzle tubes as said shafts are reciprocated up and down in the magazines.

Vertical reciprocation of the feed shafts is effected in the illustration by meshing gears 38, Fig. 7, fixed on upper end portions of these shafts, between spaced upper and lower bars 39, 40 which are vertically guided over stationary upright rods 41 and are reciprocated by links 42 equipped at their lower ends with eccentric straps 43 in engagement with eccentrics 44 on the ends of shaft 34.

Rotation of the upright feed shafts is effected in the illustration through the medium of gear 45 slidingly splined on upright shaft 46 between the cross bars 39, 40 in engagement with intermeshing gears 38 and which shaft is driven through spiral gears 47 from cross shaft 34.

The die roll 20 is intermittently turned, a step at a time, to bring each row of die cavities into line with the filling delivery nozzles by ratchet mechanism shown as consisting of a ratchet 48, Fig. 8, on the die roll shaft 49 engaged by pawl 50 on oscillating lever 51 actuated through link 52 from crank 53 on shaft 54.

Uniform, complete filling of the die cavities is effected by drawing the first dough layer 14 into the cavities by suction.

This is accomplished by providing passages 55 connecting each longitudinal row of mold cavities and opening out through opposite ends of the die roll where they are controlled by valve or closure plates 56, 57 slidably guided over stationary rods 58 and pressed toward the ends of the roll by springs 59, one of these plates, 56, having suction and pressure connections 60, 61 extended to a suction and pressure source, in this case a pump cylinder 62 pivoted on the frame of the machine at 63, Fig. 2, and having piston rod 64 connected with crank 65 on the end of shaft 54.

Fig. 4 shows how the end of the longitudinal passage 55 connecting the row of cavities at the top will register with the suction connection 60 when the roll reaches that position, and Fig. 5 shows how a passage 55 connecting a row of cavities at the bottom will register with the pressure supplying connection 61 as that row reaches a bottom position, ready for discharge of the assembled product.

Plate 56 thus serves as an automatic suction and pressure admission valve for the different rows of mold cavities as the roll is rotated step by step.

The other end plate, 57, in the illustration merely serves as a closure for that end of passages 55, and while these passages may be closed at this end the closure plate construction is preferred because it affords access to that end of the passages for cleanig or other purposes.

While the parts described may be connected in properly coordinated and synchronized relation in various ways, they are combined in the present illustration, as shown in Figs. 2 and 7, by belt drive 66 from motor 67 to a shaft 68 connected by gears 69 to a main drive shaft 70 and which latter is connected by one sprocket drive 71 with shaft 34 and a second sprocket drive 72 with shaft 54.

The latter shaft, 54, is shown connected by gears 73 and 74 to the dough mixing, kneading and feeding mechanism of hopper 11 and gear 74 is shown meshing with corresponding gear 75 on the dough sheeting and feeding mechanism of hopper 10.

Shaft 49 of the die roll is shown as carrying a pinion 76 in mesh with a gear 77 on the end of shaft 78 carrying the roll 79 which supports the assembled product, Fig. 1, and forms a backing for the transverse and longitudinal cutters 80, 81.

A cut-off switch is shown at 82, Figs. 1 and 2, having a feeler 83 resting on the material being fed to the magazines and which will automatically stop the feed mechanism if the filling material runs too high.

At times it is found desirable to have the machine turn over without feeding down the filling material. This may be accomplished in the machine illustrated through the use of a one position clutch 84 on shaft 34 and which can be thrown out and in by handle 85 on the outer end of control shaft 86 carrying clutch shifter fork 87. Opening of this clutch stops the rotary drive and vertical reciprocation of material feeding shafts 36 and vertical reciprocation of feed nozzles 27, enabling the machine to be turned over for operation of the dough sheeting and die roll mechanisms.

The one position construction of this clutch permits disconnection at any time and assures that when re-engaged the parts will all be connected in their properly synchronized relation.

In operation a first layer of dough 14 issuing from hopper 10 passes under guide roll 18 and over the top of die roll 20. As this roll, advanced step by step, brings a longitudinal row of die cavities 26 into line with nozzles 27 in the bottom of filling material magazines 23, suction created by pump 62 is applied through connection 60 to the passage 55, Figs. 3 and 4, connecting that row of cavities, causing that layer to be sucked into the mold cavities, as indicated in Fig. 1. At or about this time the feed nozzles 27 are lowered over the cupped dough and plungers 37 descend, forcing material through the nozzles into the dough cavities, completely filling the same.

As the die roll is stepped to the next position toward the right in Fig. 1, the cover sheet of dough 15 is applied by guide roll 19 and then as the die roll turns further to bring a row of filled cavities toward the bottom, pressure is applied to positively expel the row of filled units from the cavities by reason of passage 55 connecting that row coming into register with the pressure connection 61, Fig. 5.

The connected strip of filled units, expelled from the die roll as it passes over the supporting roll 79, may then be cut into smaller strips or individual units as by the cutters indicated at 80 and 81, Fig. 1.

If the filling material accumulates too fast the mechanism for feeding the filling material may be automatically stopped by feeler switch 82, 83, Fig. 1.

If it is desired to run only the dough forming and feeding mechanism, clutch 84, Fig. 7, may be thrown out by operating handle 85, Fig. 2, whereupon rotation and vertical reciprocation of vertical feed shafts 36 will be stopped and vertical reciprocation of feed nozzles 27 be interrupted while the dough sheeting and feeding mechanisms will be continued in operation.

The ends of the nozzles being curved to the approximate curvature of the die roll enables these nozzles, when lowered, to closely approach or actually contact the first layer of dough overlying the roll, thus to confine deposited material to the cupped sections of dough on the roll. The shiftability of the nozzles toward and away from the roll is advantageous for inspection, cleaning, adjustment and other purposes.

The products may be made in any desired shapes such as circular, square, triangular and the like, by use of correspondingly shaped mold cavities. Operations are automatic and may be conducted at high speed for continuous high production rate operation.

What is claimed is:

1. Machine for manufacture of ravioli and the like comprising a die roll having mold cavities in the surface of the same, means for imparting rotative movement to said die roll, means for applying a first layer of material over the top of the die roll, a nozzle for depositing filling material over said first layer of material on the die roll, means for sucking the applied layer of material into the die cavities as they reach a position beneath said filling material nozzle, means for applying a layer of cover material over said first layer and the deposited filling material and means for applying fluid pressure to the mold cavities as they reach a position at the bottom of the roll, said filling material nozzle being shaped to the approximate curvature of the die roll and being shiftable toward and away from the layer of material overlying the top of the die roll.

2. Machine for manufacture of ravioli and the like comprising the combination of a die roll having longitudinally disposed rows of mold cavities with passages connecting the same and opening out through one end of the roll, a stationary cover plate supported over said end of the roll in position closing said passages and having ports, one to register with said passages as they reach a top position of the roll and the other to register with said passages as they reach a lower position of the roll, a suction applying connection connected with said first mentioned port and a fluid pressure applying connection connected with said second mentioned port, means for depositing filling material over said layer of material applied to the roll and means for applying a layer of cover material over the deposited filling material and means for yieldingly holding said cover plate in sliding engagement with the end of the roll, whereby to cause said plate to operate as a valve for applying suction and pressure to said longitudinal passages and mold cavities in the course of rotation of said die roll.

3. The invention according to claim 2, in which said passages extend through the opposite end of the roll and a cover plate is slidingly engaged over said opposite end of the roll to normally hold the passages closed at that end of the roll and means for holding said last mentioned cover plate in slidable but removable engagement over said opposite end of the roll and whereby upon removal, the longitudinal passages in the roll will be accessible the full length of the roll for cleaning or other purposes.

References Cited in the file of this patent

UNITED STATES PATENTS

| | | |
|---|---|---|
| 1,970,396 | Scherer | Aug. 14, 1934 |
| 2,001,792 | Lombi | May 21, 1935 |
| 2,152,101 | Scherer | Mar. 28, 1939 |
| 2,227,728 | Lombi | Jan. 7, 1941 |
| 2,448,786 | Faxon | Sept. 7, 1948 |
| 2,542,239 | Engels et al. | Feb. 20, 1951 |